(12) United States Patent
Neuschaefer-Rube et al.

(10) Patent No.: US 10,151,651 B2
(45) Date of Patent: Dec. 11, 2018

(54) HOLLOW MACHINE ELEMENT AND ASSEMBLY FOR MEASURING A FORCE OR A TORQUE

(71) Applicant: SCHAEFFLER TECHNOLOGIES AG & CO. KG, Herzogenaurach (DE)

(72) Inventors: Stephan Neuschaefer-Rube, Herzogenaurach (DE); Jan Matysik, Nuremberg (DE); Darius Dlugai, Schwebheim (DE); Christian Schmitt, Niederwerrn (DE); Markus Neubauer, Memmelsdorf (DE); Tomas Smetana, Herzogenaurach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/566,860

(22) PCT Filed: Mar. 29, 2016

(86) PCT No.: PCT/DE2016/200163
§ 371 (c)(1),
(2) Date: Oct. 16, 2017

(87) PCT Pub. No.: WO2016/165703
PCT Pub. Date: Oct. 20, 2016

(65) Prior Publication Data
US 2018/0120176 A1    May 3, 2018

(30) Foreign Application Priority Data
Apr. 14, 2015    (DE) .................. 10 2015 206 664

(51) Int. Cl.
*G01L 3/10*    (2006.01)
(52) U.S. Cl.
CPC .................. *G01L 3/102* (2013.01)

(58) Field of Classification Search
CPC .......... G01L 3/102; G01L 3/101; G01L 3/104
(Continued)

(56) References Cited

U.S. PATENT DOCUMENTS

| 5,351,555 A | 10/1994 | Garshelis |
| 5,706,572 A | 1/1998 | Garshelis |

(Continued)

FOREIGN PATENT DOCUMENTS

| DE | 69222588 T2 | 5/1998 |
| DE | 19816568 A1 | 11/1999 |

(Continued)

OTHER PUBLICATIONS

International Search Report for International Application No. PCT/DE2016/200163 dated Jul. 5, 2017.

*Primary Examiner* — Jonathan Dunlap
*Assistant Examiner* — Octavia Hollington
(74) *Attorney, Agent, or Firm* — Brooks Kushman P.C.

(57) ABSTRACT

A hollow machine element for transmitting a force and/or a torque is provided. The hollow machine element forms a component of an assembly for measuring the acting force and/or torque by using inverse magnetostrictive effect. The hollow machine element extends along an axis and has a cavity that extends along the axis. The machine element includes at least one magnetization region for magnetization, and which includes a magnetostrictive material. A magnetic field measurable via the assembly can be caused by the magnetization and by the force and/or by the torque. The magnetization region is directed toward the cavity and has an axially central segment, in which the magnetization region is arranged at a radial distance from a ferromagnetic region of the machine element to define a gap therebetween. The gap may be empty or filled with insulation, to provide magnetic insulation.

14 Claims, 2 Drawing Sheets

(58) Field of Classification Search
USPC .................. 73/862.335, 862.331–862.338
See application file for complete search history.

(56) References Cited

U.S. PATENT DOCUMENTS

| | | | | |
|---|---|---|---|---|
| 5,817,952 | A * | 10/1998 | Swisher | G01L 3/102 |
| | | | | 73/862.335 |
| 5,889,215 | A * | 3/1999 | Kilmartin | G01L 3/102 |
| | | | | 73/862.333 |
| 6,330,833 | B1 * | 12/2001 | Opie | G01L 3/102 |
| | | | | 73/862.333 |
| 6,439,066 | B1 * | 8/2002 | Norton | G01L 3/102 |
| | | | | 73/862.333 |
| 6,490,934 | B2 | 12/2002 | Garshelis | |
| 7,129,609 | B1 * | 10/2006 | Mikhalev | F16J 15/43 |
| | | | | 310/90.5 |
| 7,308,835 | B2 | 12/2007 | Cripe | |
| 7,963,179 | B2 | 6/2011 | Schmitz | |
| 8,020,455 | B2 * | 9/2011 | Sihler | F03D 7/04 |
| | | | | 73/862.331 |
| 8,707,824 | B2 | 4/2014 | Benkert et al. | |
| 8,967,643 | B2 | 3/2015 | Mayer et al. | |
| 9,284,998 | B2 * | 3/2016 | Gie.beta.ibl | F16D 41/24 |
| 9,587,996 | B2 * | 3/2017 | Matysik | B05D 7/14 |
| 9,892,836 | B2 * | 2/2018 | Ausserlechner | G01P 3/487 |
| 9,989,429 | B2 * | 6/2018 | Matysik | G01L 3/103 |

FOREIGN PATENT DOCUMENTS

| | | |
|---|---|---|
| DE | 102008002065 A1 | 12/2009 |
| DE | 102011078819 A1 | 4/2012 |
| DE | 102012212060 A1 | 5/2014 |
| EP | 0803053 B1 | 8/2002 |
| EP | 2365927 B1 | 4/2013 |
| EP | 2799327 A1 | 11/2014 |
| EP | 2799827 A1 | 11/2014 |
| JP | 4910535 B2 | 4/2012 |
| WO | 9825116 A1 | 6/1998 |

* cited by examiner

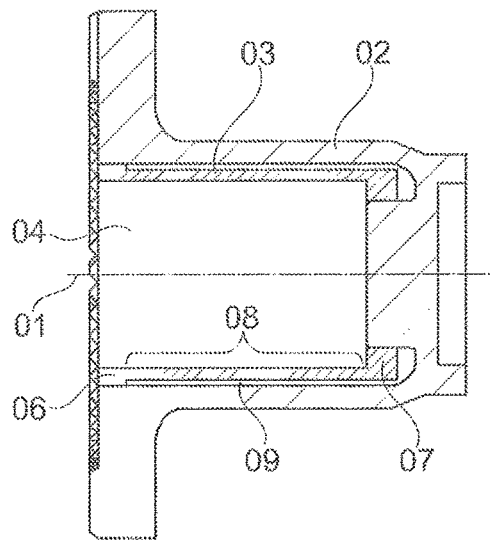
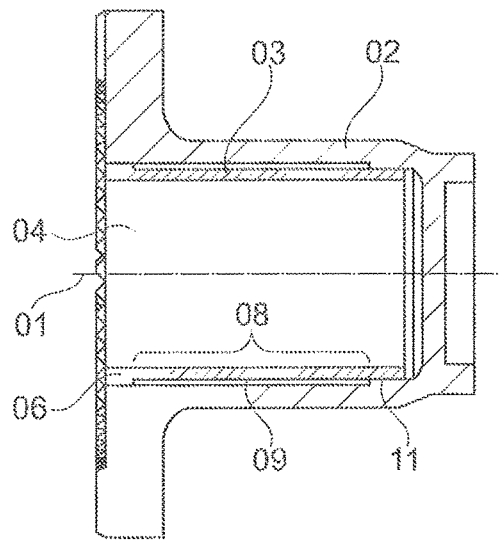
Fig. 1
Fig. 2
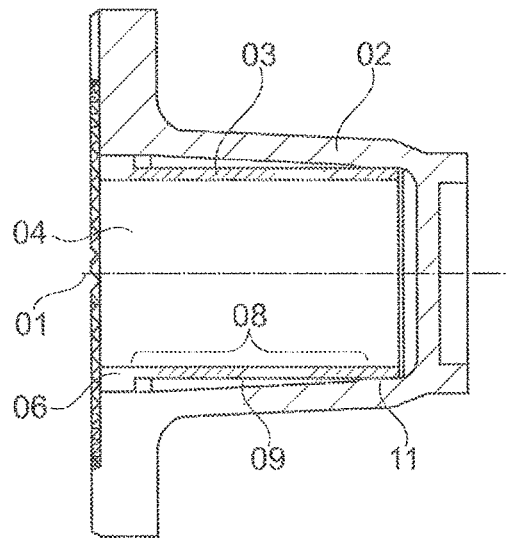
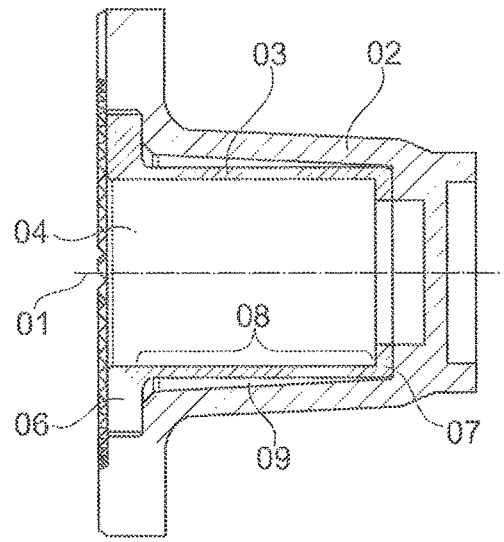
Fig. 3
Fig. 4

HOLLOW MACHINE ELEMENT AND ASSEMBLY FOR MEASURING A FORCE OR A TORQUE

CROSS-REFERENCE TO RELATED APPLICATIONS

This application is the U.S. National Phase of PCT/DE2016/200163 filed Mar. 29, 2016, which claims priority to DE 102015206664.9 filed Apr. 14, 2015, the entire disclosures of which are incorporated by reference herein.

TECHNICAL FIELD

The present disclosure relates first to a hollow machine element for the transfer of a force and/or of a torque which is a component of an assembly for measuring the active force or the active torque using the inverse magnetostrictive effect. The disclosure also relates to an assembly for measuring a force and/or a torque, which comprises the inventive hollow machine element.

BACKGROUND

EP 2 365 927 B1 shows a bottom bracket bearing with two pedal cranks and with a chain ring carrier that is connected to a shaft of the bottom bracket bearing. The chain ring carrier is connected fixedly in terms of rotation to a chain ring shaft, which is in turn connected fixedly in terms of rotation to the shaft. The chain ring shaft has a magnetization in sections. A sensor is provided that records a change in the magnetization in the case of a torque present in the region of the magnetization.

U.S. Pat. No. 6,490,934 B2 teaches a magneto-elastic torque sensor for measuring a torque which acts on an element with a ferromagnetic, magnetostrictive and magnetoelastically active region. This region is configured in a transducer that is seated as a cylindrical sleeve, for example on a shaft. The torque sensor is opposite the transducer.

A torque sensor is known from EP 0 803 053 B1 which comprises a magnetoelastic transducer. The transducer is seated as a cylindrical sleeve on a shaft.

An annular magnetized torque sensor is known from DE 692 22 588 T2.

U.S. Pat. No. 7,308,835 B2 shows a torque sensor with a magnetoelastic ring which has three rotating magnetization regions which possess opposite polarities.

JP 4910535 B2 teaches a sensor for determining a torque acting on a shaft comprising a U-shaped element made of a magnetostrictive material. The cavity formed by the U-shaped element is filled with a non-magnetostrictive material. The U-shaped element is connected to the shaft by a radial compressive stress and if necessary by electron beam welding.

A magneto-elastic torque sensor is known from EP 2 799 827 A1 in which case magnetic field sensors are arranged in the interior of a hollow shaft. The hollow shaft has rotating magnetizations with opposing polarities.

DE 10 2011 078 819 A1 shows a divided roll stabilizer with a sensor for determining an active torque in the roll stabilizer. The sensor comprises a magnetically coded primary sensor which can be formed from a sleeve seated on the roll stabilizer. Alternatively, the magnetically coded primary sensor can be a sleeve which is incorporated in a cavity of a hollow flange of the roll stabilizer.

Proceeding from the prior art, the present disclosure addresses the problem of increasing the precision of a measurement of forces and/or torques on a hollow machine element based on the inverse magnetostrictive effect.

SUMMARY

The stated problem is solved by a hollow machine element according to the attached claim 1 as well as by an assembly according to the attached equivalent claim 10.

The inventive hollow machine element primarily serves the purpose of transferring at least a force and/or at least a torque. The force or the torque acts on the machine element, as a result of which there are mechanical stresses and the machine element in most cases slightly deforms. The machine element extends along an axis, wherein the axis may also be a rotational axis of the machine element.

The machine element is hollow since it has a cavity extending at least partially along the axis. The cavity is configured in particular in the region of the axis. The cavity may extend over more than half of the axial length of the machine element. The cavity may be open on an axial end of the machine element. Preferably it has the shape of a cylinder.

The hollow machine element is configured as a component of an assembly for measuring the at least one acting force or the at least one acting torque. This measurement is based on the inverse magnetostrictive effect. Hence, a secondary function of the hollow machine element consists in forming a primary sensor within the assembly for measuring the at least one acting force or the at least one acting torque. For this purpose, the hollow machine element comprises at least one magnetization region for a magnetization that consists of a magnetostrictive material. A magnetic field measurable by means of the assembly can be caused by the magnetization as well as by the force or by the torque.

The at least one permanently or temporarily magnetized magnetization region is preferably magnetically neutral in a state of the hollow machine element unloaded by a force or a torque outside of the magnetization region, so that no technically relevant magnetic field is measurable outside of the magnetization region. The at least one magnetization region constitutes a part of the volume of the machine element.

The magnetization region is directed toward the cavity, so that it is an interior of the machine element. Hence the magnetization region is arranged radially inward. The magnetization region does not form a radial exterior of the machine element. The magnetization region is an integral component of the hollow machine element.

In accordance with embodiments of the invention, the magnetization region has an axially central segment in which the magnetization region is arranged at a radial distance from a ferromagnetic region of the machine element and/or at a radial distance from a thermally conductive region of the machine element. The ferromagnetically configured region of the machine element or the thermally conductive region of the machine element differs from the magnetization region. The ferromagnetically configured region of the machine element is magnetically conductive. The thermal conductivity of the thermally conductive region of the machine element is at least 0.1 W/(m·K). The ferromagnetically configured region of the machine element may also be thermally conductive, so that the ferromagnetically configured region of the machine element and the thermally conductive region of the machine element are identical. Alternatively, the thermally conductive region of the machine element is not ferromagnetic and consists of a synthetic material, especially a fiber-reinforced plastic. The axially central segment has an axial length which may be at least half, and at least two thirds of the axial length of the magnetization region. In the axially central segment the magnetization region does not contact the ferromagnetically configured or the thermally conductive region, since at least to a large extent a radial distance is configured in between. The radial distance may be circumferentially configured. The radial distance may be configured over the entire axial length of the axially central segment.

One special advantage of the inventive hollow machine element is the fact that through a simple design measure the measurability of the magnetic field caused by the magnetization as well as by the force or by the torque is significantly improved.

The magnetization region and the ferromagnetically configured region constitute two regions of the hollow machine element that form a composite structure of the hollow machine element. Alternatively, the magnetization region and the thermally conductive region are two regions of the hollow machine element, forming a composite structure of the hollow machine element.

In one embodiment, the radial distance between the magnetization region and the ferromagnetically configured region of the machine element is more than 1%, and may be more than 2% of the radial distance between the ferromagnetically configured region of the machine element and the axis.

The radial distance between the magnetization region and the thermally conductive region of the machine element may be more than 1%, and may be more than 2% of the radial distance between the thermally conductive region of the machine element and the axis.

In one embodiment, the radial distance between the magnetization region of the machine element and the ferromagnetically configured region of the machine element is more than 1 mm, and may be more than 2 mm. The radial distance between the magnetization region and the ferromagnetically configured region of the machine element may be less than 10 mm.

In one embodiment, the radial distance between the magnetization region and the thermally conductive region of the machine element is more than 1 mm, and may be more than 2 mm. The radial distance between the magnetization region and the thermally conductive region of the machine element may be less than 10 mm.

In the case of at least one embodiment of the inventive hollow machine element, the radial distance between the magnetization region and the ferromagnetically configured region of the machine element within the axially central segment is constant.

In the case of alternative at least one embodiment of the inventive hollow machine element, the radial distance between the magnetization region and the ferromagnetically configured region of the machine element within the axially central segment changes in axial direction, wherein this change is preferably linear.

In the case of embodiments of the inventive hollow machine element, the radial distance between the magnetization region and the thermally conductive region of the machine element within the axially central region is constant.

In the case of alternative embodiments of the inventive hollow machine element, the radial distance between the magnetization region and the thermally conductive region of the machine element within the axially central segment changes in axial direction, wherein this change is linear.

In the case of embodiments of the inventive hollow machine element, the ferromagnetically configured region surrounds the magnetization region circumferentially. The ferromagnetically configured region encloses the magnetization region circumferentially. In the process, the ferromagnetically configured region is arranged radially outward.

In the case of embodiments of the inventive hollow machine element, the thermally conductive region surrounds the magnetization region circumferentially. The thermally conductive region may enclose the magnetization region circumferentially. In the process, the thermally conductive region is arranged radially outward.

The magnetization region of the machine element is configured to be rotationally symmetrical, wherein the axis of the machine element also is an axis of symmetry of the magnetization region.

The ferromagnetically configured region of the machine element is configured to be rotationally symmetrical, wherein the axis of the machine element also is an axis of symmetry of the ferromagnetically configured region of the machine element.

The thermally conductive region of the machine element is configured to be rotationally symmetrical, wherein the axis of the machine element also is an axis of symmetry of the thermally conductive region of the machine element.

The inventive hollow machine element may be rotationally symmetrical, wherein its axis also simultaneously is an axis of symmetry.

The magnetization region may possesses the basic shape of a hollow cylinder; in particular the basic shape of a sleeve. The axis of the machine element also is the axis of the hollow cylinder.

In the case of embodiments of the inventive hollow machine element, the magnetization region at two axial positions enclosing the axially central segment is firmly connected to the ferromagnetically configured region of the machine element, in each case with a separate connection. Consequently, the magnetization region is firmly connected to the ferromagnetically configured region of the machine element preferably at its axial ends, so that the force acting from the outside or the torque acting from the outside on the machine element in any case also act on the magnetization region.

In the case of embodiments of the inventive hollow machine element, the magnetization region at two axial positions enclosing the axially central segment is firmly connected to the thermally conductive region of the machine element, in each case with a separate connection. Consequently, the magnetization region is firmly connected to the thermally conductive region of the machine element at its axial ends, so that the force acting from the outside or the torque acting from the outside on the machine element in any case also act on the magnetization region.

The sleeve forming the basic shape of the magnetization region may have an annular reinforcement protruding radially inward or radially outward on both of its axial ends, via which it is firmly connected to the ferromagnetically configured region of the machine element. Through the one annular reinforcement or the two annular reinforcements the radial distance in the axially central segment can be ensured with low expenditure, since the ferromagnetically configured region of the machine element must be configured solely with a cylinder-shaped inside wall.

The sleeve forming the basic shape of the magnetization region may have an annular reinforcement protruding radially inward or radially outward on both of its axial ends, via which it is firmly connected to the thermally conductive region of the machine element. Through the one annular reinforcement or the two annular reinforcements the radial distance in the axially central segment can be ensured with low expenditure, since the thermally conductive region of the machine element must be configured solely with a cylinder-shaped inside wall.

In the case of embodiments of the inventive hollow machine element, the sleeve forming the basic shape of the magnetization region is firmly connected to the ferromagnetically configured region of the machine element or to the thermally conductive region of the machine element on its axial ends, in each case with a separate connection. The two firm connections can each be configured on an exterior, on a front side or on an inside of the sleeve. The two firm connections can in each case be an adhesive bond, by a non-positive connection or by a positive connection. The two connections may be formed in each case by a welded connection, by a resistance welded connection, by a capacitor pulse welded connection or by a shrink-on connection. The positive connection may be formed by a toothing, for example by a radial toothing. In principle, the two firm connections can be of different type or also in each case formed by a combination of connection types.

In the case of embodiments of the inventive hollow machine element, the sleeve forming the basic shape of the magnetization region is in each case firmly clamped on its axial ends in the ferromagnetically configured region of the machine element. These two clampings can each be configured on an exterior, on a front side or on an inside of the sleeve.

In the case of embodiments of the inventive hollow machine element, the sleeve forming the basic shape of the magnetization region is in each case firmly clamped on its axial ends in the thermally conductive region of the machine element. These two clampings can each be configured on an exterior, on a front side or on an inside of the sleeve.

In the case of embodiments of the inventive hollow machine element, the ferromagnetically configured region has, at least where it surrounds the magnetization region, the basic shape of a hollow cylinder, within which the magnetization region is arranged. The hollow cylinder forming the basic shape of the ferromagnetically configured region has an inside diameter which is greater than the outside diameter of the magnetization region, so that the magnetization region is arranged at a radial distance to the ferromagnetically configured region of the machine element. The difference of the stated diameter determines the radial distance. The inside diameter of the hollow cylinder forming the basic shape of the ferromagnetically configured region is more than 2 mm, and may be more than 4 mm greater than the outside diameter of the magnetization region.

In the case of embodiments of the inventive hollow machine element, the thermally conductive region has, at least where it surrounds the magnetization region, the basic shape of a hollow cylinder, within which the magnetization region is arranged. The hollow cylinder forming the basic shape of the thermally conductive region has an inside diameter which may be greater than the outside diameter of the magnetization region, so that the magnetization region is arranged at a radial distance to the thermally conductive region of the machine element. The difference of the stated diameter determines the radial distance. The inside diameter of the hollow cylinder forming the basic shape of the thermally conductive region is more than 2 mm, and may be more than 4 mm greater than the outside diameter of the magnetization region.

In one embodiment, the magnetization region is arranged within the axially central segment completely circumferentially at a radial distance to the ferromagnetically configured region of the machine element.

In one embodiment, the magnetization region is arranged within the axially central segment completely circumferentially at a radial distance to the thermally conductive region of the machine element.

In the case of embodiments of the inventive hollow machine element, a magnetically insulating spaced cavity is arranged between the magnetization region in its axially central segment and the ferromagnetically configured region. The spaced cavity may have the shape of a hollow cylinder whose thickness is at least 1 mm, and in some embodiments at least 2 mm. A gas, such as e.g. air or a vacuum is in the spaced cavity. The gas or the vacuum is magnetically non-conductive and is not magnetostrictive.

In the case of alternative embodiments of the inventive hollow machine element, a magnetically insulating spaced layer is arranged between the magnetization region in its axially central segment and the ferromagnetically configured region. The spaced layer may consist of a magnetically non-conductive and non-magnetostrictive material. Hence, the magnetization region, the spaced layer and the ferromagnetically configured region form three consecutive layers of a layer structure of the machine element.

The spaced layer has the shape of a hollow cylinder whose thickness may be at least 1 mm, and may be at least 2 mm.

In the case of embodiments of the inventive hollow machine element, a thermally insulating spaced cavity is arranged between the magnetization region in its axially central segment and the thermally conductive region. The spaced cavity has the shape of a hollow cylinder whose thickness may be at least 1 mm, and may be at least 2 mm. A gas, such as e.g. air or a vacuum is in the spaced cavity. The gas or the vacuum is thermally non-conductive or hardly conductive.

In the case of alternative embodiments of the inventive hollow machine element, a thermally insulating spaced layer is arranged between the magnetization region in its axially central segment and the thermally conductive region. The spaced layer consists of a thermally non-conductive material whose thermal conductivity may be less than 0.1 W/(m·K); further and may be less than 0.05 W/(m·K). Hence, the magnetization region, the spaced layer and the thermally conductive region form three consecutive layers of a layer structure of the machine element.

The spaced layer may have the shape of a hollow cylinder whose thickness may be at least 1 mm, and may be at least 2 mm.

In the case of embodiments of the inventive hollow machine element, the magnetization region has a thickness in its axially central segment that is less than the thickness of the ferromagnetically configured region in this axial segment. Further the magnetization region may have a thickness in its axially central segment that is less than half as great as the thickness of the ferromagnetically configured region in this axial segment. The magnetization region may have a thickness in its axially central segment that is less than 20% of the thickness of the ferromagnetically configured region in this axial segment.

In the case of embodiments of the inventive hollow machine element, the magnetization region has a thickness in its axially central segment that is less than the thickness of the thermally conductive region in this axial segment. Further the magnetization region may have a thickness in its axially central segment that is less than half as great as the thickness of the thermally conductive region in this axial segment. The magnetization region has a thickness in its axially central segment that is less than 20% of the thickness of the thermally conductive region in this axial segment.

The ferromagnetically configured region of the hollow machine element or the thermally conductive region of the hollow machine element may be a main component of the machine element which is configured for the original function of the machine element for transferring the at least one force and/or the at least one torque. The magnetization region, on the other hand is a primary sensor of the assembly for measuring the acting force or the acting torque.

The ferromagnetically configured region, i.e. the main component of the machine element has a magnetostrictivity that may be lesser than the magnetostrictivity of the magnetization region. The ferromagnetically configured region, i.e. the main component of the machine element has no magnetostrictivity or only a low magnetostrictivity.

The ferromagnetically configured region, i.e. the main component of the machine element may consist of a steel. In this case the ferromagnetically configured region simultaneously also constitutes the thermally conductive region of the machine element.

The magnetization region and the ferromagnetically configured region may have an identical expansion coefficient. At least the magnetization region and the ferromagnetically configured region have expansion coefficients that may differ from one another by less than 10%.

The magnetization region and the ferromagnetically configured region may have an identical elasticity module. At least the magnetization region and the ferromagnetically configured region have elasticity modules that may differ from one another by less than 30%.

The magnetization region and the ferromagnetically configured region may consist predominantly of the same material, which may be further formed by iron.

The magnetization region and the thermally conductive region may have an identical expansion coefficient. At least the magnetization region and the thermally conductive region have expansion coefficients that may differ from one another by less than 10%.

The magnetization region and the thermally conductive region may have an identical elasticity module. At least the magnetization region and the thermally conductive region have elasticity modules that may differ from one another by less than 30%.

The ferromagnetically configured region or the thermally conductive region, i.e. the main component of the machine element may be axially longer than the magnetization region. For example, the magnetization region is configured in the form of a sleeve-like inner layer axial on one side in the machine element.

The magnetization region may be magnetically conductive.

The at least one magnetization region can be permanently or temporarily magnetized. The magnetization region may be, however, permanently magnetized by at least one permanent magnetization, so that the magnetization is formed by a permanent magnetization. In the case of alternative embodiments the magnetization region is temporarily magnetizable, for example by an electromagnet or by a permanent magnet, which is a component of the assembly for measuring the force and/or the torque. The magnetization region does not have to be completely magnetized or completely temporarily magnetizable by the permanent magnetization. Hence, neutral segments of the magnetization region can be present, for example as axial segments.

The at least one permanent magnetization may be oriented rotating around the axis, so that it is configured in tangential direction. The magnetization region can also have several of the rotating permanent magnetizations, which are configured as tracks, wherein the polarity of the several rotating permanent magnetizations can be oriented alternately.

The machine element may have the outer basic shape of a prism or cylinder, wherein the prism or cylinder is arranged coaxially to the axis. The prism or cylinder may be straight. The machine element may have the outer basic shape of a straight circular cylinder, wherein the circular cylinder is arranged coaxially to the axis. In the case of special embodiments the prism or cylinder is conically configured. In this respect the cavity extends over the entire axial length of the machine element, possessing the shape of a hollow cylinder.

The machine element may be formed by a partially hollow shaft, by a hollow shaft, by an at least partially hollow selector fork or by a hollow flange. The partially hollow shaft, the hollow shaft, the partially hollow selector fork or the hollow flange can be designed for loads through different forces or torques and for example can be a component of a sensor bottom bracket bearing, a roll stabilizer or a fertilizer distributor. In principle, the hollow machine element can also be formed by completely different machine element types.

The specified directions, namely the axial direction, the tangential direction and the radial direction relate to the axis of the hollow machine element.

The inventive assembly serves the purpose of measurement of a force and/or of a torque on the inventive hollow machine element. The force or the torque acts on the hollow machine element, as a result of which there are mechanical stresses and the machine element in most cases slightly deforms. The assembly further comprises a magnetic field sensor which is arranged in the cavity of the machine element. The magnetic field sensor is a secondary sensor for determining the force or torque. The primary sensor, i.e. the at least one magnetization region is used to convert the force or torque to be measured into a corresponding magnetic field, while the secondary sensor makes possible the conversion of this magnetic field into electrical signals.

The inventive assembly serves the purpose of measurement of a force and/or a torque on one of the embodiments of the inventive hollow machine element. The machine element or its embodiment is a component of the inventive arrangement.

The at least one magnetic field sensor may be formed in each case by a fluxgate sensor or by a fluxgate magnetometer. The magnetic field sensor is alternatively formed by a Hall sensor, by a coil or by a semiconductor sensor. In principle a different sensor type can also be used, provided it is suitable for measuring the magnetic field caused by the inverse magnetostrictive effect.

BRIEF DESCRIPTION OF THE DRAWINGS

Further details, advantages and developments of the disclosure arise from the following description of embodiments of the invention, referring to the drawing. The figures show the following:

FIG. 1 shows a first embodiment of an inventive hollow machine element;

FIG. 2 shows a second embodiment of an inventive hollow machine element;

FIG. 3 shows a third embodiment of an inventive hollow machine element;

FIG. 4 shows a fourth embodiment of an inventive hollow machine element; and

DETAILED DESCRIPTION OF THE DRAWINGS

Figure 5:
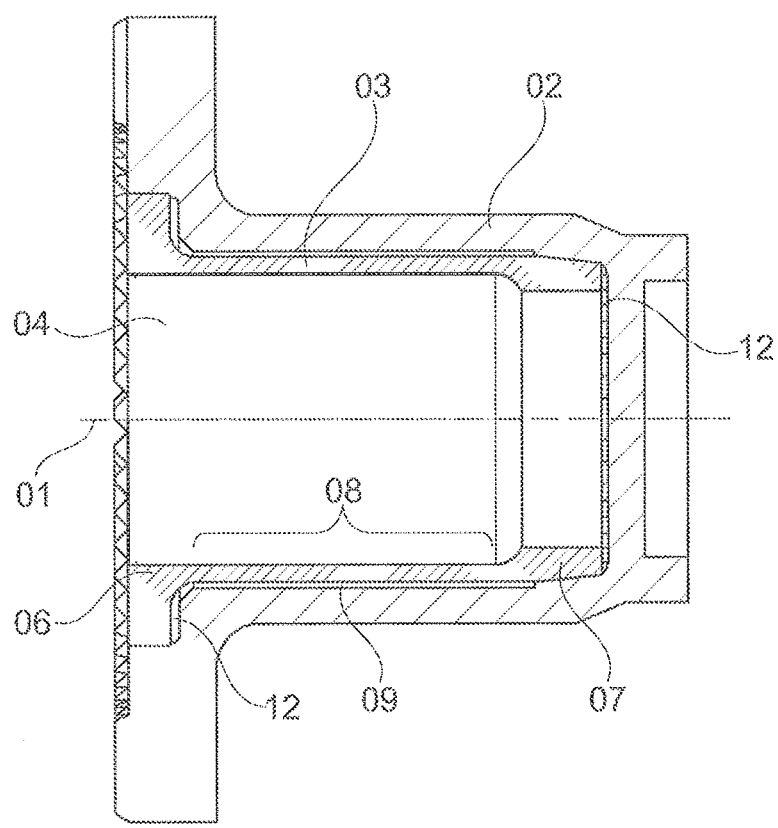
FIG. 5 shows a fifth embodiment of an inventive hollow machine element.

FIG. 1 shows a first embodiment of an inventive hollow machine element in the form of a hollow flange in a cross-section. The hollow machine element extends along an axis 01. The hollow machine element is configured to be rotationally symmetrical around the axis 01.

The hollow machine element comprises a ferromagnetic main component 02 made of a steel, so that it also constitutes a thermally conductive region of the hollow machine element. The ferromagnetic main component 02 is designed to absorb and transfer the forces and/or torques to be transferred from the hollow machine element.

The ferromagnetic main component 02 is predominantly hollow cylindrically configured, wherein in the inside of the ferromagnetic main component 02 a sleeve-like magnetization region 03 is arranged, which is likewise a component of the hollow machine element. In the inside of the sleeve-like magnetization region 03 a cylinder-shaped cavity 04 is configured, which is also a cavity of the machine element and in which a magnetic field sensor (not shown in the figure) is arranged.

The sleeve-like magnetization region 03 has an annular reinforcement 06 on its first axial end, which is directed radially outward. The sleeve-like magnetization region 03 has an annular reinforcement 07 on its second axial end which is directed radially inward. The sleeve-like magnetization region 03 is firmly connected to the ferromagnetic main component 02 solely via the annular reinforcements 06, 07. The mechanical connections can be based on an adhesive bond, non-positive or positive connection. Since the annular reinforcements 06, 07 are arranged on the axial ends of the sleeve-like magnetization region 03, the forces and/or torques acting on the ferromagnetic main component 02 are largely also transferred to the sleeve-like magnetization region 03.

An axially central segment 08 is present between the annular reinforcements 06, 07 of the axial ends of the sleeve-like magnetization region 03, said axially central segment in which a magnetically insulating spaced layer 09 is arranged between the sleeve-like magnetization region 03 and the ferromagnetic main component 02. Instead of the magnetically insulating spaced layer 09, a magnetically insulating spaced cavity (not shown in the figure) can also be arranged there.

The hollow machine element does not have an undercut, so that the sleeve-like magnetization region 03 can be inserted into the ferromagnetic main component 02 and fastened there without difficulties.

FIG. 2 shows a second embodiment of the inventive hollow machine element in a cross-section. Initially, this embodiment resembles the embodiment shown in FIG. 1. In contrast to the embodiment shown in FIG. 1, the annular reinforcement 07 on the second axial end of the sleeve-like magnetization region 03 is lacking. Instead of this, the ferromagnetic main component 02 has an annular reinforcement 11 on this axial position, in order to clamp the sleeve-like magnetization region 03 there from the outside. Hence, the ferromagnetic main component 02 has a smaller inside diameter in the region of the annular reinforcement 11, in order to firmly accommodate the sleeve-like magnetization region 03, which constitutes an alternative to the embodiment shown in FIG. 1, in which case the sleeve-like magnetization region 03 has the annular reinforcement 07, which is firmly accommodated from the inside by the ferromagnetic main component 02.

FIG. 3 shows a third embodiment of the inventive hollow machine element in a cross-section. Initially, this embodiment resembles the embodiment shown in FIG. 2. In contrast to the embodiment shown in FIG. 2, the spaced layer 09 is not configured in the shape of a hollow cylinder, but rather in the shape of a hollow truncated cone. Hence the distance between the sleeve-like magnetization region 03 and the ferromagnetic main component 02 in axial direction changes.

FIG. 4 shows a fourth embodiment of the inventive hollow machine element in a cross-section. Initially, this embodiment resembles the embodiment shown in FIG. 3. In contrast to the embodiment shown in FIG. 3, the sleeve-like magnetization region 03 has the annular reinforcement 07 shown in FIG. 1 on the second axial end, which however is mechanically firmly connected to the ferromagnetic main component 02 on the front side. The mechanical connections can for example be resistance welded connections or capacitor pulse welded connections.

FIG. 5 shows a fifth embodiment of the inventive hollow machine element in a cross-section. Initially, this embodiment resembles the embodiment shown in FIG. 4. In contrast to the embodiment shown in FIG. 4, the annular reinforcements 06, 07 are additionally mechanically firmly connected to the ferromagnetic main component 02 by positive connections 12 on the axial ends of the sleeve-like magnetization region 03.

LIST OF REFERENCE SYMBOLS

1 Axis
2 Ferromagnetic main component made of steel
3 Sleeve-like magnetization region
4 Cylinder-shaped cavity
6 Annular reinforcement
7 Annular reinforcement
8 Axially central segment
9 Magnetically insulating spaced layer
11 Annular reinforcement
12 Annular reinforcement

The invention claimed is:

1. A hollow machine element for transferring a rotational force, the machine element extending along an axis, the machine element comprising:
an interior cavity extending along the axis and configured as a component of an assembly for measuring an acting force;
at least one magnetization region providing a magnetization, and having a magnetostrictive material;
wherein the assembly is configured to measure a magnetic field via the magnetization and by the force; and
wherein the magnetization region is directed toward the cavity and has an axially central segment in which the magnetization region is arranged at a radial distance from a ferromagnetically configured region of the machine element or at a radial distance from a thermally conductive region of the machine element, and wherein the radial distance between the magnetization region and the ferromagnetically configured region of the machine element or the thermally conductive region of the machine element is more than 1% of the radial distance between the ferromagnetically configured region of the machine element and the axis.

2. The hollow machine element according to claim 1, wherein the ferromagnetically configured region of the machine element or the thermally conductive region of the machine element encloses the magnetization region circumferentially.

3. The hollow machine element according to claim 1, wherein the magnetization region is a sleeve.

4. The hollow machine element according to claim 3, wherein the sleeve has a pair of axial ends, and an annular reinforcement protruding radially inward or radially outward on one or both of the axial ends, via which the sleeve is firmly connected to the ferromagnetically configured region of the machine element or to the thermally conductive region of the machine element.

5. The hollow machine element according to claim 1, wherein the magnetization region is firmly connected to the ferromagnetically configured region of the machine element or to the thermally conductive region of the machine element at two axial positions enclosing the axially central segment, each axial position having a separate connection.

6. The hollow machine element according to claim 1, wherein a magnetically insulating spaced cavity is arranged between the magnetization region and the ferromagnetically configured region of the machine element or between the magnetization region and the thermally conductive region of the machine element in the axially central segment of the magnetization region.

7. The hollow machine element according to claim 1, wherein a magnetically insulating spaced layer is arranged between the magnetization region and the ferromagnetically configured region of the machine element or the thermally conductive region of the machine element in the axially central segment of the magnetization region.

8. The hollow machine element according to claim 7, wherein the magnetization region, the spaced layer and the ferromagnetically configured region or the thermally conductive region form three consecutive layers of a layer structure of the machine element.

9. The hollow machine element according to claim 1, in which the cavity includes at least one magnetic field sensor arranged therein.

10. A hollow machine element for transferring a rotational force or torque comprising:
 a ferromagnetic outer component having a cylindrical interior surface and extending along a central axis;
 a magnetized sleeve having a first axial end, a second axial end, and a central region between the first and second ends, the magnetized sleeve defining a central cylindrical cavity configured to house a magnetic field sensor;
 wherein the first end and the second end of the sleeve are connected to the ferromagnetic outer component, and the central region is radially spaced from the interior surface of the ferromagnetic outer component by a cavity configured to magnetically insulate the ferromagnetic outer component from the central region of the magnetized sleeve, and wherein the first end extends radially outward from the central region and the second end extends radially inward from the central region.

11. The hollow machine element of claim 10, wherein the cavity is filled with an insulation.

12. The hollow machine element of claim 10, wherein the first end defines a radially-outward surface that terminates at the ferromagnetic outer component, and the second end defines a radially-inward surface that terminates at the ferromagnetic outer component.

13. The hollow machine element of claim 10, wherein the ferromagnetic outer component tapers radially inwardly along a direction from the first end to the second end of the sleeve.

14. The hollow machine element of claim 10, wherein the ferromagnetic outer component has a first end defining a cylindrical flange, and the first end of the sleeve has a corresponding cylindrical flange that is secured to the flange of the ferromagnetic outer component.

* * * * *